United States Patent [19]
Isaman

[11] Patent Number: 5,841,998
[45] Date of Patent: Nov. 24, 1998

[54] SYSTEM AND METHOD OF PROCESSING INSTRUCTIONS FOR A PROCESSOR

[75] Inventor: David L. Isaman, San Diego, Calif.

[73] Assignee: Metaflow Technologies, Inc., La Jolla, Calif.

[21] Appl. No.: 853,566

[22] Filed: May 9, 1997

Related U.S. Application Data

[63] Continuation-in-part of Ser. No. 775,583, Dec. 31, 1996.

[51] Int. Cl.$^6$ ........................................................ G06F 9/30
[52] U.S. Cl. ............................................ 395/384; 395/388
[58] Field of Search .................................... 395/384, 385, 395/386, 387, 388, 389

[56] References Cited

U.S. PATENT DOCUMENTS 5,748,951  5/1998  Webb et al. ............................. 395/595

Primary Examiner—William M. Treat
Attorney, Agent, or Firm—Theodore E. Galanthay; Lisa K. Jorgenson

[57] ABSTRACT

A data processing system includes an instruction unit generating a program instruction. A parse unit coupled to the instruction unit receives the program instruction. The parse unit determines whether the instruction contains both load and store operations and generates first and second parcels for the instruction containing both load and store operations. A decode unit coupled to the parse unit receives the first and second parcels. The decode unit attaches an identification number to the first and second parcels, the identification number of the second parcel being determinable from the identification number of the first parcel. An issue unit coupled to the decode unit receives the first and second parcels. The issue unit issues the parcels to an instruction shelf, a load shelf, and a store shelf for instruction execution.

23 Claims, 13 Drawing Sheets

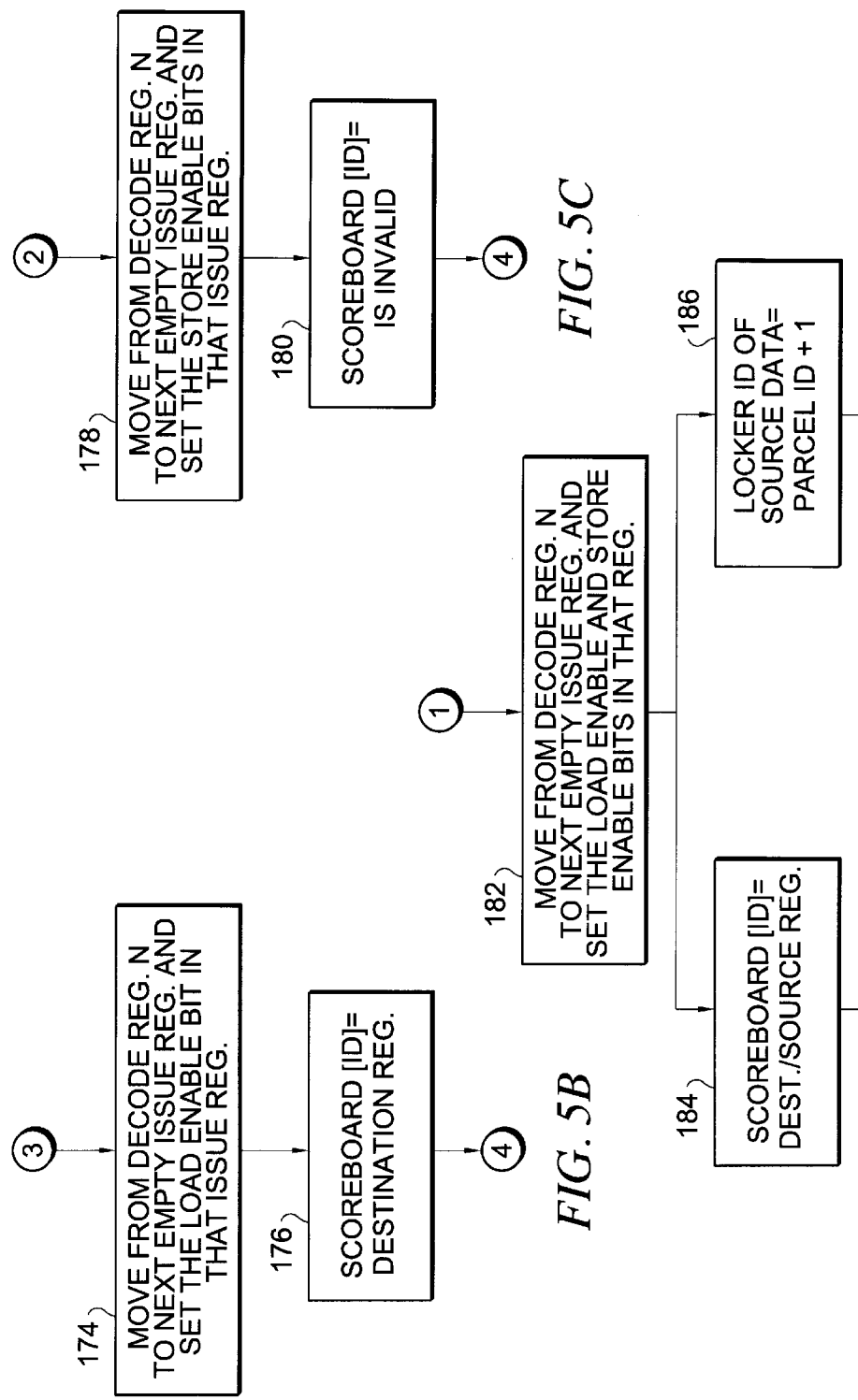

SYSTEM AND METHOD OF PROCESSING INSTRUCTIONS FOR A PROCESSOR

CROSS REFERENCE TO RELATED APPLICATION

This application is a continuation-in-part of U.S. patent application Ser. No. 08/775,583 entitled "FLOATING POINT OPERATION SYSTEM," filed on Dec. 31, 1996, the content of which is relied upon and incorporated by reference.

BACKGROUND OF THE INVENTION

1. Field of the Invention

The present invention relates to a system for processing instructions for a processor, and more particularly, to a system for processing instructions having load and store operations.

2. Discussion of the Related Art

Conventional processor designs commonly involve the control of instructions in three stages—fetch, issue, execute. In the first stage, an instruction is fetched from memory at a location identified by a program counter which points to the latest fetched instruction, thereby allowing the next instruction to be fetched. Following the fetch, the instruction is checked for possible data dependencies and, if it passes the test, the instruction and its operands are then issued for execution. (Data dependencies are circumstances where an instruction cannot be executed because data for the instruction is not yet available.) The instructions issued can be identified by a issue-virtual program counter. Once an instruction is issued, it is sent to the execution stage, where it produces a result that is written into either a register file or a memory, thereby altering the state of the processor. Another program counter, the update-virtual PC, identifies the instruction that just completed updating the state of the processor. The three such program counters (fetch, issue-virtual and update-virtual) are traditionally synchronized. Thus, an instruction that is fetched is issued if its operands are available, and an instruction that is issued goes through the execution pipeline. At the end of the pipeline, the state of the processor is updated. The instructions are fetched, issued, and executed, and the processor state is updated, in strict sequential order as defined by the order of instructions in the program.

The three program counters (fetch, issue-virtual and update-virtual) in a traditional processor are linked together so that they point to successive adjacent instructions. Thus, at any time, the fetch, issue-virtual and update-virtual program counters in a conventional processor point to instructions N+2, N+1, and N.

More recent advanced processors include another element called a register scoreboard which checks resources for an instruction to see if the required resources are available for the instruction to execute. If so, the instruction is issued even before the instruction in the execution stage has finished, which can result in out-of-order execution. The register scoreboard records (locks) the resources that would be modified by the instruction at issue time. Any subsequent instructions that want to access those resources cannot be issued until the instructions that initially locked them subsequently unlocks them by updating the resources, and so notifying the processor.

These known processor designs operate with the disadvantage that any stop in the issue of instructions, typically due to resource dependency among instructions, will stop the instruction fetch. This stopping results in loss of performance because fewer instructions are issued for execution. The direct dependency between the issue-virtual and the fetch program counters in a conventional processor thus inhibits achievement of peak performance. This loss of performance is even more pronounced when multiple instructions are fetched simultaneously. In a traditional pipelined processor design, putting N pipelines in parallel so N instructions can be fetched in every cycle does not increase the performance by a factor of N because there are interactions between every element in the matrix of pipelines and instructions, thus increasing the data dependency conflicts.

Some prior art processor designs include branch prediction. In such systems when the processor executes an instruction, in which a branch is reached, a prediction is made as to the likely direction of execution. The processor then executes down that branch of instructions while it awaits validation of the first branch. If a second branch is reached before the first one is validated, the processor stops fetching instructions, degrading performance.

A processor having at least some of the features discussed above is the Intel x86 microprocessor. However, one inconvenient feature of the Intel x86 architecture, for example, is that integer instructions may have an operand and a result at the same memory address, and hence both load and store operations to the same address are required. Thus, assembler operations such as ADD or SUB, for example, imply both a data load operation and a data store operation—data must be fetched from an address, modified in some way (e.g. combined with other data) and then saved back to the same address. In a CISC/RISC architecture (where CISC instructions are decomposed into RISC instructions for execution), such operations ("load-store" operations) are decomposed into an arithmetic portion and a data-handling portion. However, the data-handling portion must contain separate RISC-operations ("R-OPs") for the load phase and the store phase. For example, the Intel Pentium Pro uses four operations for each such instruction: (1)load address calculation, (2) store address calculation, (3) arithmetic operation (R-op), and (4) store data. As a result, when both the result and an operand require the same address, the address is needlessly computed a second time. This increases the number of RISC operations or "parcels" into which each such instruction must be decomposed.

Thus, an improved method for handling load-store instructions in a CISC/RISC architecture is needed to overcome such inconvenience of having to calculate the same address (for the operand and the result) twice.

SUMMARY OF THE INVENTION

Accordingly, the present invention is directed to a system and method for processing instructions in a processor that substantially obviates one or more of the problems due to limitations and disadvantages of the related art.

An object of the present invention is to provide a system and method for processing instructions that reduces the number of clocks needed and simplifies the process.

Another object of the present invention is to provide a system and method for processing instructions for reducing the number of parcels needed in an instruction operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data processing system comprising an instruction unit generating a program instruction; a parse unit coupled to the instruction unit and receiving the program instruction, the parse unit determining whether the instruction contains both load and store operations and generating first and second parcels for the instruction containing both load and store operations; a decode unit coupled to the parse unit and receiving the first and second parcels, the decode unit attaching an identification number to the first and second parcels, the identification number of the second parcel being determinable from the identification number of the first parcel; an issue unit coupled to the decode unit and receiving the parcels, the issue unit issuing the parcels to an instruction shelf, a load shelf, and a store shelf for instruction execution.

In another aspect of the present invention, a method for processing data comprising the steps of parsing an instruction containing both load and store operations to generate only first and second parcels; decoding the first and second parcels; issuing the first and second parcels; and executing the first and second parcels.

In another aspect of the present invention, a method for processing data comprising the steps of parsing an instruction containing both load and store operations to generate only first and second parcels; decoding the first and second parcels, the step of decoding the first and second parcels including the step of generating both a load enable signal and a store enable signal for a same parcel; issuing the first and second parcels and placing one of the first and second parcels on both a load shelf and a store shelf; and executing the first and second parcels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A–5D is a flowchart of a decode stage in accordance with the present invention;

DETAILED DESCRIPTION OF PREFERRED EMBODIMENTS

Reference will now be made in detail to the preferred embodiments of the present invention, examples of which are illustrated in the accompanying drawings.

Figure 1:
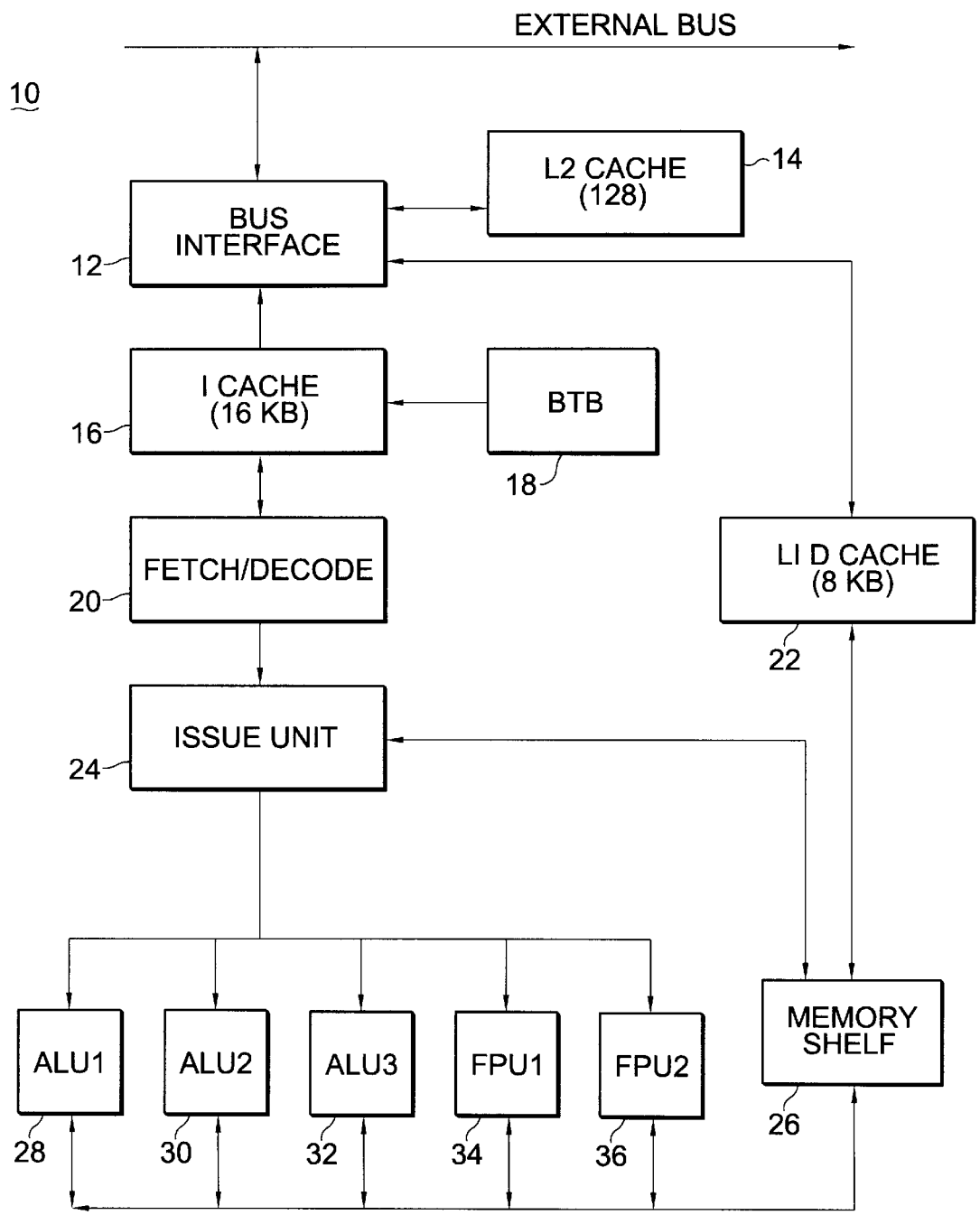
FIG. 1 is a block diagram of a system architecture of a processor used in the present invention.

FIG. 1 illustrates an example system architecture that may be used in the present invention. The system architecture of FIG. 1 includes an external bus connected to a bus interface 12 which is connected to both L1 and L2 caches. The L1 cache includes both the instruction cache 16, which is connected to a branch target buffer (BTB) 18, and data cache 22. The instruction cache 16 is connected to fetch/decode unit 20, which is connected to the issue unit 24. The issue unit 24 is connected to the memory shelf 26 and also to arithmetic logic units (ALUs) (28, 30, 32) and floating point units (FPUs) (34,36).

Figure 2:
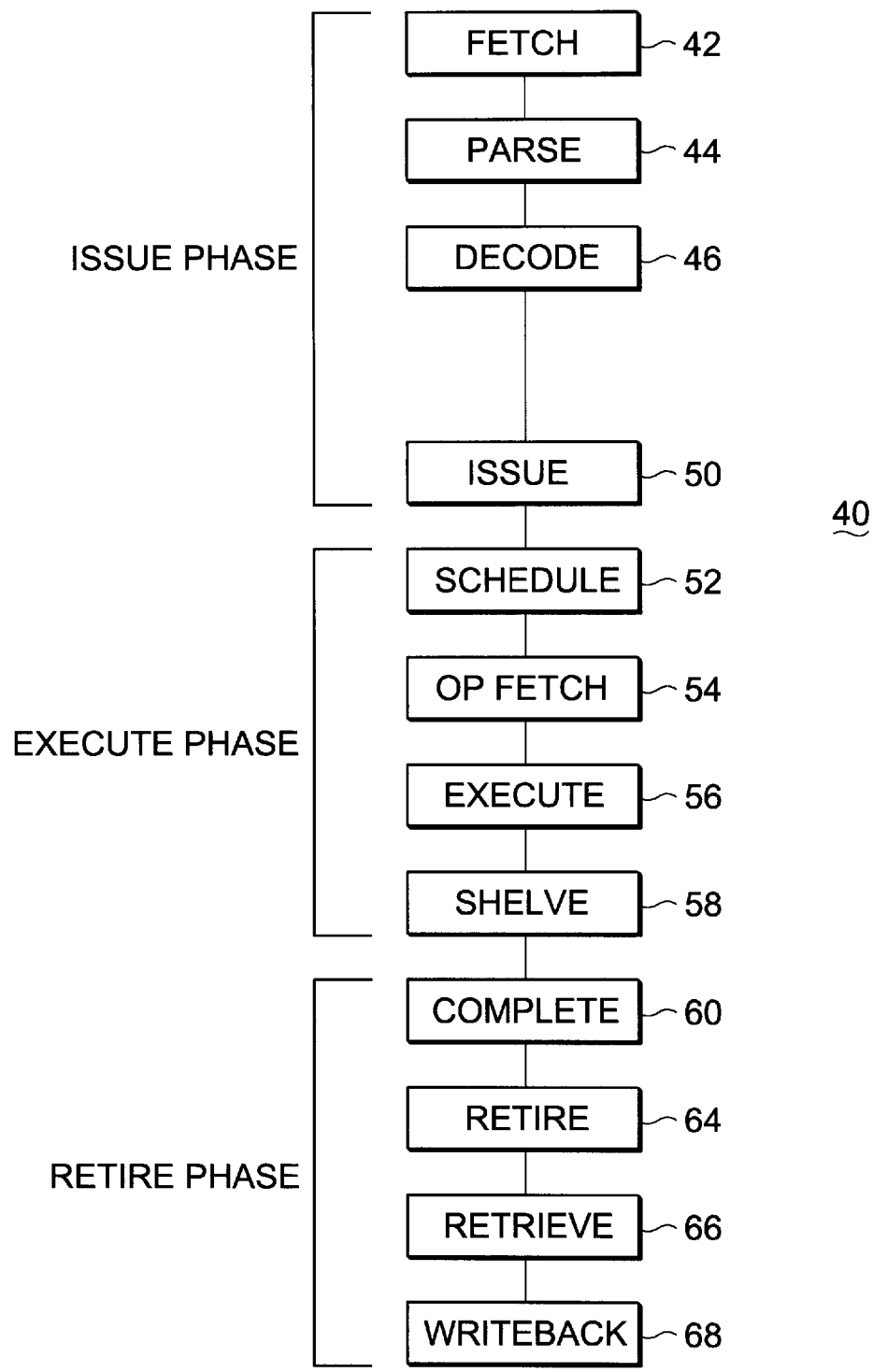
FIG. 2 shows an instruction flow of operations.

In the present invention, instructions are generally processed in three phases—issue phase, execute phase, and retire phase. An instruction flow including these phases is shown in FIG. 2A. The issue phase processes the instructions "in order" and includes the following stages: fetch 42, parse 44, decode 46, and issue 50. The execute phase processes the instructions "out of order" and includes the following stages: schedule 52, operand fetch 54, execute 56, and shelve 58. The retire phase processes the instruction "in order" again and includes the following stages: complete 60, retire 64, retrieve 66, and writeback 68. The stages of the three phases are processed in a pipeline.

A basic pipeline block diagram, which allows an out-of-order execution of instructions, is illustrated in FIG. 2B. The primary elements of the basic pipeline include an instruction cache, a register file, and one or more execution units, all separated by pipeline registers.

The out-of-order execution scheme as well as other relevant portions of this application are explained in detail in the following three references, the contents of all of which are incorporated by reference in this application: (1) U.S. Pat. No. 5,487,156 to Popescu et al. entitled "PROCESSOR ARCHITECTURE HAVING INDEPENDENTLY FETCHING ISSUING AND UPDATING OPERATIONS OF INSTRUCTIONS WHICH ARE SEQUENTIALLY ASSIGNED AND STORED IN ORDER FETCHED," filed Dec. 5, 1990 (the '156 patent); (2) "The Metaflow Architecture," by Val Popescu et al., IEEE Micro, June 1991 (the Metaflow architecture); (3) "Instruction Issue Logic for High-Performance, Interruptible, multiple Functional Unit, Pipelined Computers," by Gurindar S. Sohi, IEEE Transactions On Computers, vol. 39, No. 3, March 1990 (the Sohi paper).

Referring now to FIG. 2A, during the instruction fetch stage 42 of the issue phase, a cache line is read from the instruction cache into the instruction fetch buffer. The instruction fetch stage works in conjunction with a branch target cache, which predicts the next fetch address from the instruction cache. The instruction parse stage 44 of the issue phase detects instruction type and its boundaries and passes appropriate instruction bytes to the instruction decode stage. In the instruction decode stage 46, the instruction bytes from the parse stage 44 are fed to four decoders in parallel, for example, in addition to the microcontrol ROM. These decoders translate the x86 instruction bytes, for example, to RISC operations called "parcels." Also, all register renaming is done during the decode stage. The instruction issue stage 50 shelves the instructions in an instruction shelf in parallel with the memory shelf if it is a load or store instruction.

In the schedule stage 52 of the execution phase, the ALU or FPU selects an instruction based on the availability of operands and its age. The oldest instruction with its operands available will be selected first. After an instruction is scheduled for execution, its operands are fetched from either the result shelf or sane register file. The result shelf is a memory structure where results of instructions are stored temporarily before the instruction can be retired. A sane register file is the physical register file which is visible to the programmer. As shown in the example system architecture of FIG. 1, there are five execution units including three ALUs and two FPUs. ALU1 is capable of all arithmetic operations and ALU2 is capable of all arithmetic operations except multiply and divide. ALU3 is used for resolving indirections for memory operations, i.e., it does all the address calculations for memory operations. FPU1 is capable of add, integer to floating point conversion and vice versa, round to integer, subtract and multi-media instructions. FPU2 is capable of divide, square root, multiply and transcendental functions. Hence, up to two floating point instructions can be issued to the floating point unit every clock. The last stage of the execution phase is the shelve stage 58. Although the execution phase is performed out of order, the next phase, retire phase, is performed in order. Thus, in the shelve stage 58, results of the instructions executed out of order are stored in a result shelf. The data from the result shelf can be used by dependent instructions.

The retire phase includes four stages—completion, retire, retrieve, and writeback. In the completion stage, completion of all the parcels of an instruction is detected, as are traps and faults on any of the parcels. In the retire stage, the number of completed parcels that can be retired in a single clock is determined. When a parcel is retired, its results are read from the result shelf in the retrieve stage 66. Then, the results from the result shelf are committed to the programmer visible register file in the writeback stage 68.

The present application is directed to the issue phase and the execute phase of the above three phases and discloses a novel system and method for reducing the number of parcels or RISC OPS needed in load and store operations by using a single parcel for both. A detail explanation of the issue phase including parse, decode, and issue stages, and the execute phase in accordance with the present invention is discussed below.

Figure 3:
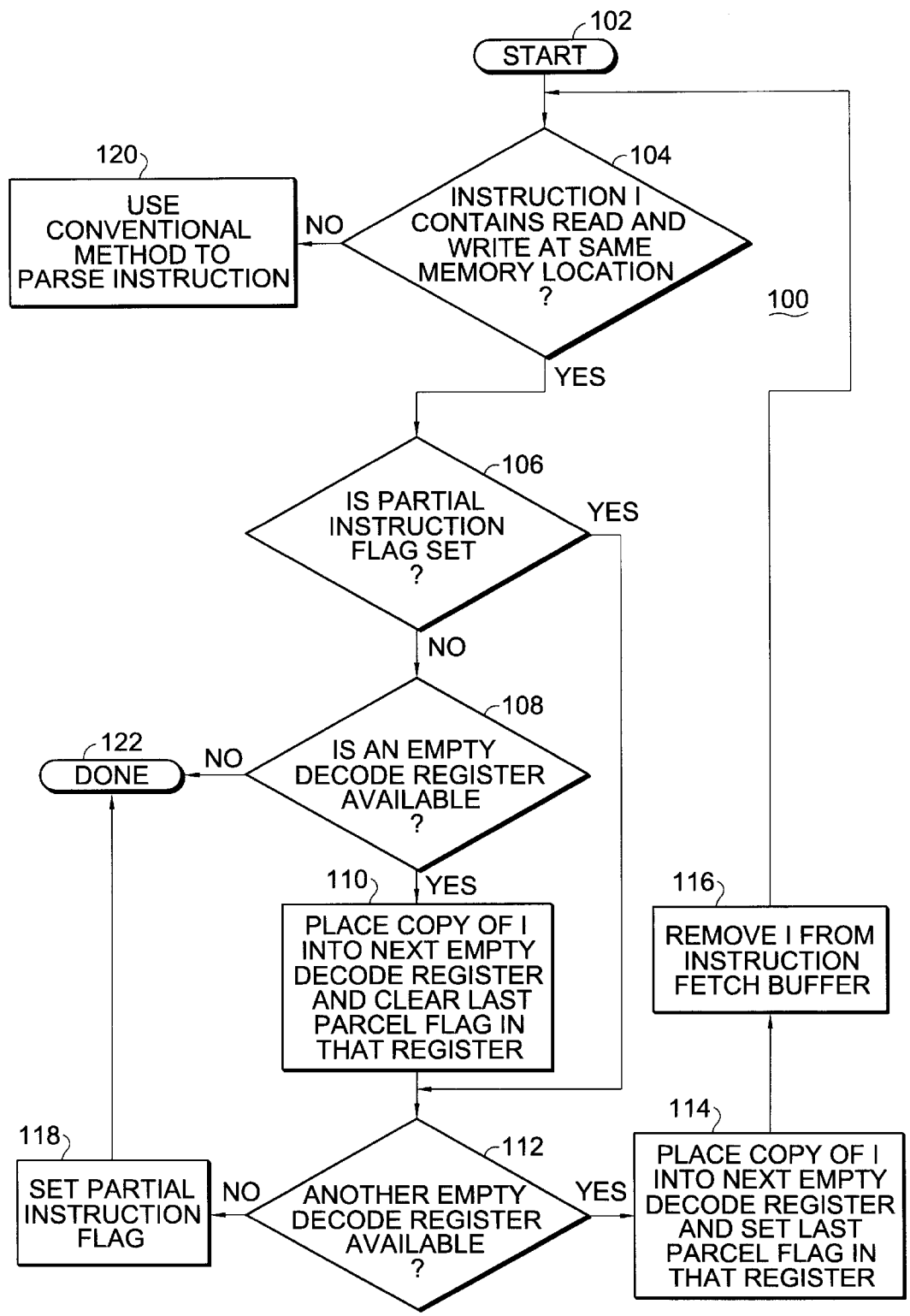
FIG. 3 shows a flowchart of an instruction parse stage in accordance with the present invention.
Figure 4:
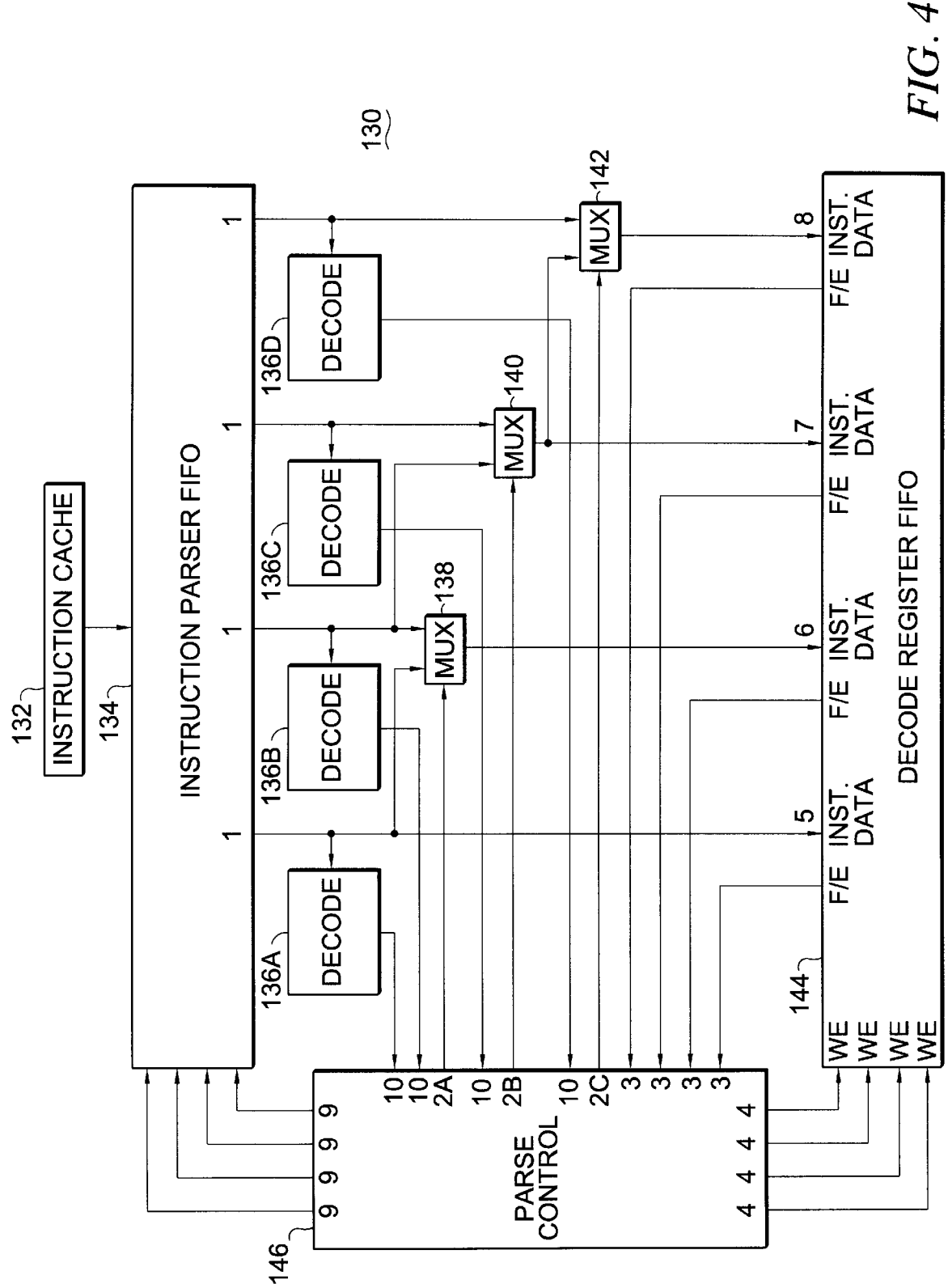
FIG. 4 is a block diagram of a preferred embodiment of the instruction parse stage shown in FIG. 3.

A flowchart and a block diagram of the parse stage is shown in FIGS. 3 and 4, respectively. Referring to FIG. 3, when an instruction does not contain both load (read) and store (write) at the same memory location, the present invention uses a conventional method to parse the instruction (step 120), such as the method used in the x86 architecture. If the instruction does contain read and write at the same memory location, then it is determined whether a partial instruction flag is set (step 106). If the instruction flag is not set, it is determined whether an empty decode register is available (step 108). If there is no empty decode register available, then the process is done (step 122) until an empty decode register becomes available. A new clock is needed for each iteration. When an empty decode register is available (step 108), then a copy of the instruction is placed into the empty decode register and the last (second) parcel flag is cleared in that decode register (step 110).

When a partial instruction flag is set, this means that the first parcel has already been placed into an empty decode register, and the current parcel is the last or second of the two parcels from the single instruction read from the instruction cache. If another empty decode register is available (step 112), then a copy of the same instruction is placed into the next empty decode register and the last parcel flag in that decode register is set (step 114). Then, the instruction is removed from the instruction fetch buffer (step 116), and the whole process starts over with another instruction. If, in step 112, there is no additional empty decode register available, then the partial instruction flag is set (step 118), and the process is done (step 122). The partial instruction flag notifies the system that during the next clock the instruction needs to be copied to the next available empty register to form the second parcel.

Accordingly, in the parse stage shown in the flowchart of FIG. 3, two parcels are generated from one instruction where the instruction contains both read and write at the same memory location. If an empty decode register is not available, then the process waits until an empty decode register becomes available at the expense of a clock for each iteration. If at least two empty decode registers are available, then the first and second parcels are generated in the same clock. However, if only one empty decode register is available, then the first parcel is generated during the current clock and the second parcel is generated during the next clock. Thus, the first and second parcels are saved in contiguous decode registers. The flowchart of FIG. 3 detects whether the current parcel is the first or second parcel by determining whether the instruction flag is set or not. If there are no empty decode registers available during the current clock, then the process must wait for the next clock to start over until an empty decode register becomes available.

A preferred embodiment of an implementation of the process shown in the flowchart of FIG. 3 is illustrated in FIG. 4. Referring to FIG. 4, instruction cache 132 provides the instruction to the instruction parser FIFO 134. Decoders 136A, 136B, 136C, and 136D determine whether the instruction reads and writes some memory location. The partial instruction flag (step 166 in FIG. 3) is controlled in the parse control unit 146. The partial instruction flag has the purpose of distinguishing between first and second parcels in an instruction requiring two parcels. For example, during a current clock, if there is room for only one parcel, i.e., only one empty decode register is available, then the first parcel is copied into that available empty decode register, and the second parcel is copied into the next empty decode register that becomes available during the subsequent clock. In the next clock, the partial instruction flag will have been set so that the process will remember that the first parcel was already issued.

The signal lines shown in FIG. 4 from 1–10 represent the following:

| Signal Line | Signal Name |
| --- | --- |
| 1 | instruction data from instruction parser FIFO |
| 2A, 2B, 2C | parse control signals |
| 3 | decode register full or empty signal |
| 4 | decode register write enable signal |
| 5 | instruction data input to decode register 1 |
| 6 | instruction data input to decode register 2 |
| 7 | instruction data input to decode register 3 |
| 8 | instruction data input to decode register 4 |
| 9 | instruction removal control signal |
| 10 | load-store signal |

The decoders 136A–136D inform the parse control 146 whether the instruction has both read and write operations through signal lines 10. The instruction data 1 from the instruction parser FIFO 134 is forwarded to the decode register FIFO 144 as instruction data 5, 6, 7 or 8 through multiplexers (MUX) 138, 140, and 142, which determine whether an instruction should be copied to more than one decode register in accordance with control signals from the parse control 146. The parse control 146 provides the parse control signals 2A, 2B, and 2C to the multiplexers 138, 140, and 142 to forward instructions to the appropriate decode registers. The decode register FIFO 144 containing the decode registers inform the parse control 146 whether each of the decode registers are full or empty 3. In response, the parse control 146 provides write enable signals 4 to the decode register FIFO 144 for the instruction data to be copied into the decode registers in conjunction with the decoders 136A–136D and multiplexers 138, 140, and 142.

In the preferred embodiment, up to four empty registers are available at a time. Accordingly, the decoders 136A–136D determine whether an instruction contains both read and write and generate a load-store signal 10 to the parse control 146. If an instruction requires both (load) read and (store) write, the multiplexers 138, 140, or 142 allow one instruction to be copied twice to form two parcels. In particular, MUX 138 provides the ability to make two copies of the first instruction, MUX 140 provides the ability to make two copies of the second instruction, and MUX 142 provides the ability to make two copies of the second or the third instruction. Also, the parse control 146 provides an instruction removal control signal 9 to the instruction parser FIFO 144 to remove the instruction when the parse stage is complete.

In the present invention, the parse stage need only produce two parcels of an instruction that includes load and store of the same memory address. For example, the following instruction replaces contents of memory location of address "bx+si" with the sum of its existing content and content of register dx:

ADD [bx+si],dx

The conventional method requires three parcels to complete the instruction: (1) an operand is loaded from memory to a temporary register (e.g., LD temp,[bx+si]), (2) added to contents of another register (e.g., ADD temp,dx), and (3) stored the result back in the same memory location (e.g., ST [bx+si],temp). Since the conventional method requires 3 parcels, the memory address is needlessly calculated in both the load (first) parcel and the store (third) parcel. In the present invention, the load parcel and the store parcel are combined to become the load-store parcel (e.g., LDST [bx+si],temp). Thus, only two parcels of the present invention would do the job of the three parcels needed in the conventional method. This means that in the flowchart 100 of the parse stage of the preferred embodiment in FIG. 3, a load-store instruction is copied to only two decode registers to form two parcels. This has the advantage of freeing the third parcel for the next instruction, saving clock cycles and parse bandwidth. The example discussed above will be explained with reference to FIGS. 12A and 12B later.

Once the instruction is parsed and copied to the appropriate decode registers, the pipeline advances to the decode stage.

Figure 5A:
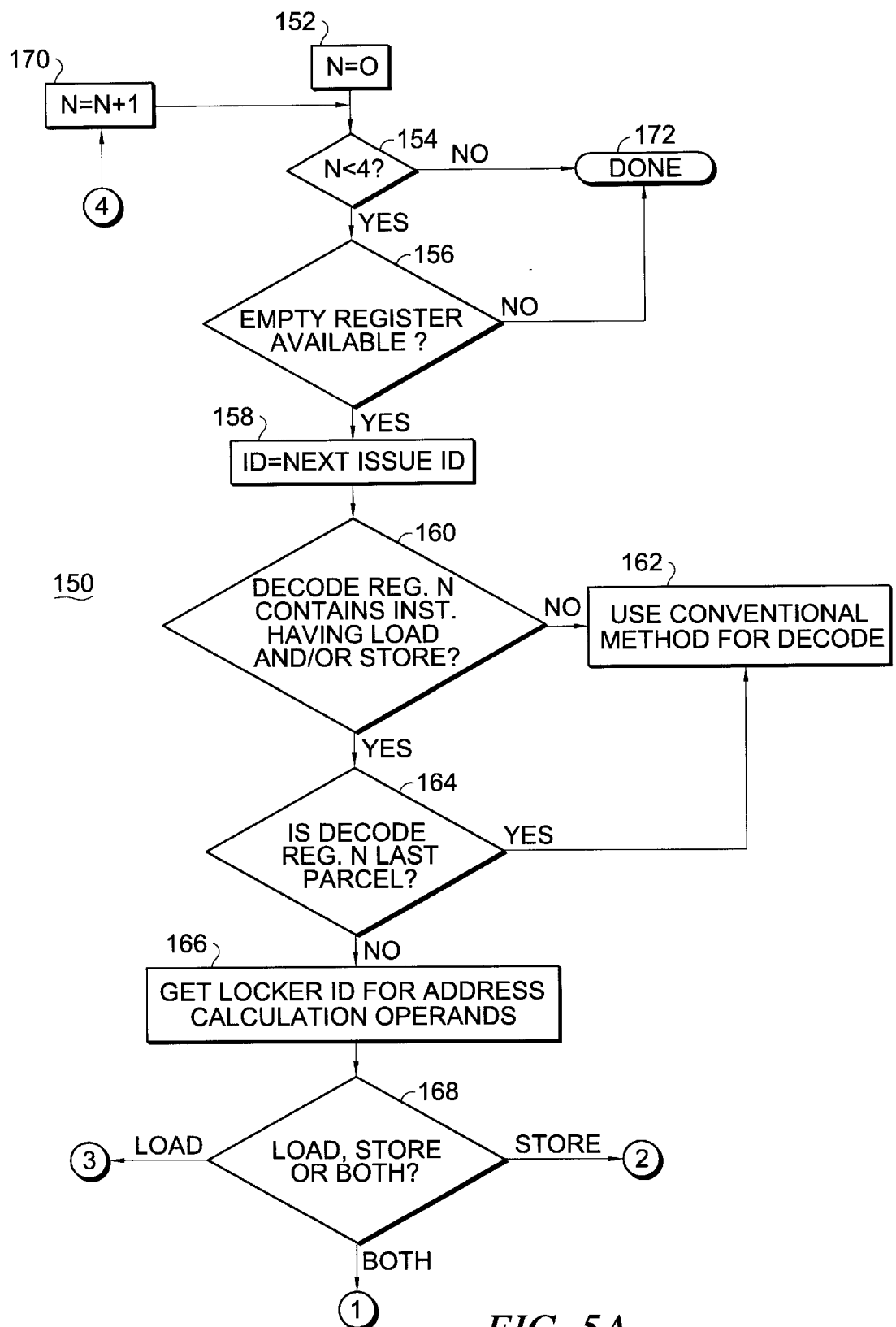

FIGS. 5A to 5D and FIG. 6 show the flowchart and block diagram of the decode stage, respectively, in accordance with the present invention. Referring to FIG. 5A, since there are up to four decode registers in the present embodiment, the decode stage first determines whether a counter "N" is less than 4 (step 154) after being initialized (step 152). If the counter N is not less than 4, then the decode stage is done (step 172). If the counter N is less than 4, then as with the parse stage, it is first determined whether an empty issue register is available, which is the next stage in the pipeline. If an empty issue register is not available (step 156), then the process waits for the next and subsequent clocks until an empty issue register becomes available. If an empty register is available, then an identification ID is generated for the current parcel being decoded (step 158). After an ID is attached to the parcel, the process determines whether the decode register contains an instruction having load and/or store (step 160). If the instruction in the decode register does not contain either a load or a store, then the conventional method is used for the decoding process (step 162). The conventional method for decoding is described, for example, in the '156 patent, the Metaflow Architecture, and the Sohi paper, discussed above.

If the instruction in the decode register has load and/or store, then it is determined whether the decode register is the last parcel, i.e., second of the two parcels. If it is the second parcel, then the conventional method is used to decode the instruction as well. The conventional method is used for the second parcel because in the second parcel, a register-to-register operation will take place.

In an instruction containing both load (LD) and store (ST) with an ADD operation, the first parcel calculates the address in memory, loads the operand from memory, and places it into a temporary register. Then, the second parcel undergoes a register-to-register operation using that temporary register, and places the result back into the temporary register. In the conventional method of processing a load and store instruction having a common memory address for both load and store operations, a third parcel is needed to store the temporary register back in the memory location where the operand originated from. The present invention does not require a third parcel since the memory address calculated in the first parcel is used to do the store. Thus, when the decode register contains the second parcel, the conventional decoding method is used.

Nevertheless, if the instruction contains either one of load or store (but not both) in conjunction with an operation, such as ADD, the conventional method for decoding may be used as well (step 162). As shown in FIG. 5A, such instruction would still require two parcels, where one of the parcels would do the address calculation and the other parcel would do the ADD operation, for example (or whatever operation the instruction calls for). If, for example, the instruction was a pure load or a pure store without any other operation, then only one parcel would be needed.

If the decode register does not contain the last or second parcel (step 164), then locker identification ID for address calculation operands are provided for each parcel (step 164). Subsequently, the process determines whether the instruction is specifically a load, a store, or both (step 168). If the instruction contains a load only, then the instruction is moved from the decode register to the next available empty issue register, and the load enable bit in that issue register is set (step 174), as shown in FIG. 5B. Then, the scoreboard ID takes on the destination register (step 176) and the counter is incremented (step 170) to process the next decode register beginning from step 154 again. If the instruction contains a store (step 168), then the instruction from the decode register is moved to the next empty issue register, and the store enable bit in the issue register is set (step 178), as shown in FIG. 5C. Here, the scoreboard ID is invalid (step 180), and the counter is incremented (step 170) to process the next decode register. If the instruction contains both a load and a store, then the instruction in the decode register is moved to the next empty issue register, and both load enable and store enable bits in that issue register are set (step 182), as shown in FIG. 5D. The scoreboard ID takes on the destination and source registers (step 184) and the locker ID of the source data becomes (ID+1) (step 186). Then, the counter is incremented (step 170) to process the next decode register.

The scoreboard ID is generated from a scoreboarding unit. The scoreboard unit is used to keep track of necessary sequencing relations among the instructions. Among other things, it identifies the ID of the parcel performing the most recent write to a given register. The "Instruction Shelf", within the Popescu et al. architecture (see the '156 patent and the Metaflow Architecture), is somewhat analogous to the "Reservation Station" used in the Intel Pentium Pro architecture. The "Store Shelf" manages posted writes. The Store Shelf keeps track, for various instructions, of affected addresses and the "locker" instruction which generated data to be stored at a given address. The "Load Shelf" keeps track of the memory data addresses of load parcels as they are calculated out of order.

In a preferred embodiment, instructions such as the x86 instructions are broken down into parcels. Before calculating the load and store addresses, the system recognizes whether they refer to the same address. If so, the address is calculated once, then the result is stored in both the load shelf and the store shelf. The operand is loaded. The arithmetic operation is then performed, and the result stored in the address from which the operand was taken. The scoreboarding unit ensures that there are no sequencing errors, even when the instructions are executed out of order. In particular, the unit prevents the system from reading a register or memory location until all logical previous writes have taken place, and ensures that a write command is not executed until all necessary reads of the previous data have taken place.

In the scoreboard unit, every parcel is defined by an ID, which basically serves as a name or tag for the results produced by the parcel. For example, a load operation loads an operand from memory into a destination register. The scoreboard unit records at the decode stage that the load parcel will write to this destination register. In the scoreboard unit, the ID of the load parcel is located, and the number of the register that will be updated by the parcel is written in the scoreboard unit. Some instructions do not write any registers such as store, branch, and NOP, for example. Thus, the scoreboard entry for these parcels is invalid. The scoreboard entry is valid when the instruction writes a register. Thus, for the store parcel, the locker ID of the source data is valid but the entry at the scoreboard ID for the store parcel is invalid.

For the case when the instruction contains both load and store, the scoreboard entry for the first parcel is set to be the destination register since the load operation writes data into the destination register, which becomes the source register for the store operation. For the store parcel, the locker ID for the source data is the ID of the parcel that produced the data to be stored, which is the parcel immediately following the load-store LDST parcel. Thus, the locker ID of the source data can be determined without going back to the scoreboard since it is one plus (+1) the ID of the load-store (LDST) parcel, which is the parcel that wrote the destination register.

Figure 6:
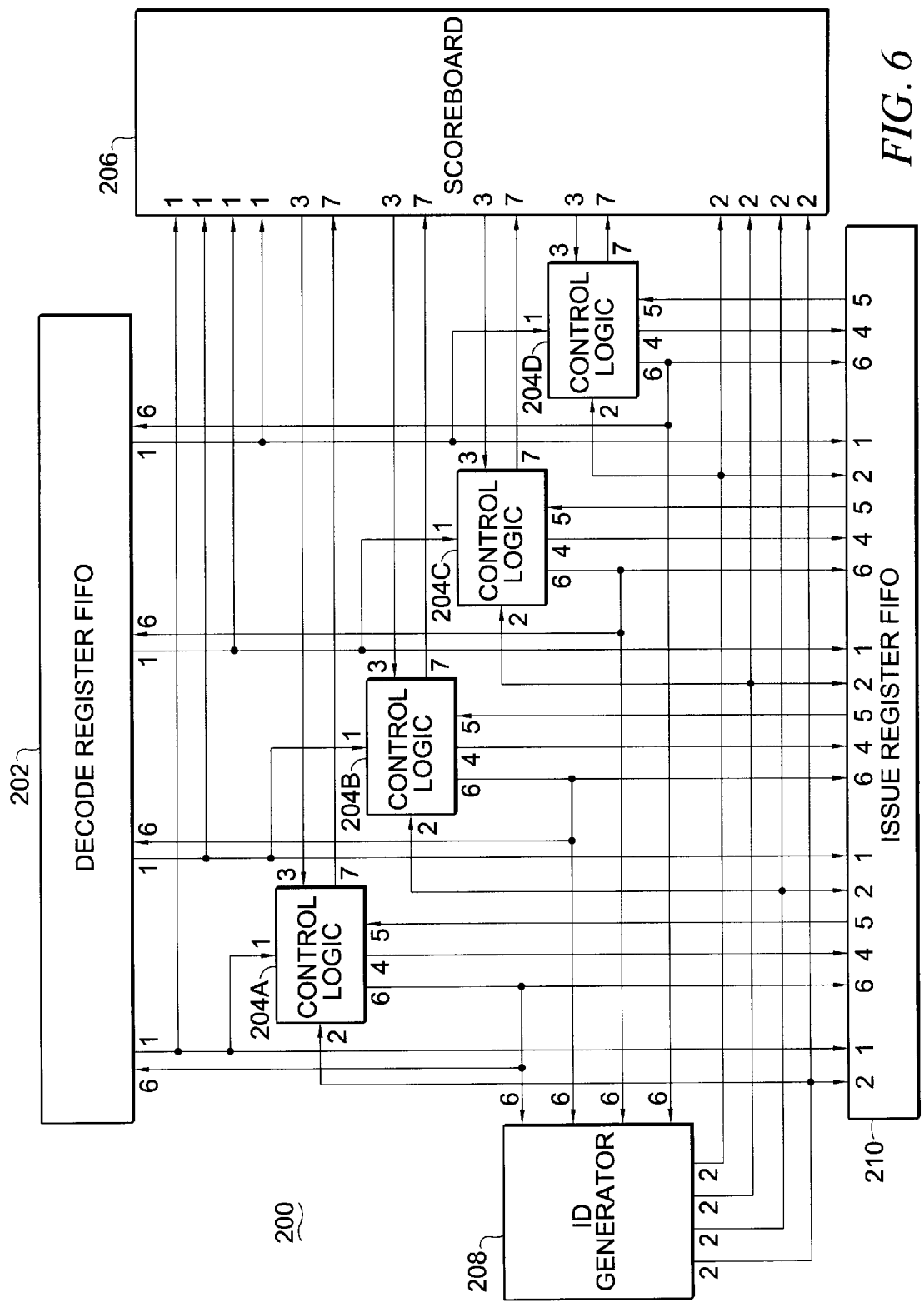
FIG. 6 is a block diagram of a preferred embodiment of the decode stage shown in FIGS. 5A–5D.

A preferred embodiment of an implementation of the flowchart in FIGS. 5A to 5D is shown in FIG. 6. Referring to FIG. 6, the decode stage 200 includes the decode register FIFO 202 (which is labeled 144 in FIG. 4), control logic units 204A, 204B, 204C, and 204D, scoreboard unit 206, and an ID generator 208. The result of the decode stage, which is explained below, is placed in the issue register FIFO 210. The decode register FIFO 202 is connected to the control logic units 204A to 204D and to the scoreboard unit 206. The control logic units are connected to the ID generator 208 and scoreboard unit 206.

Figure 7:
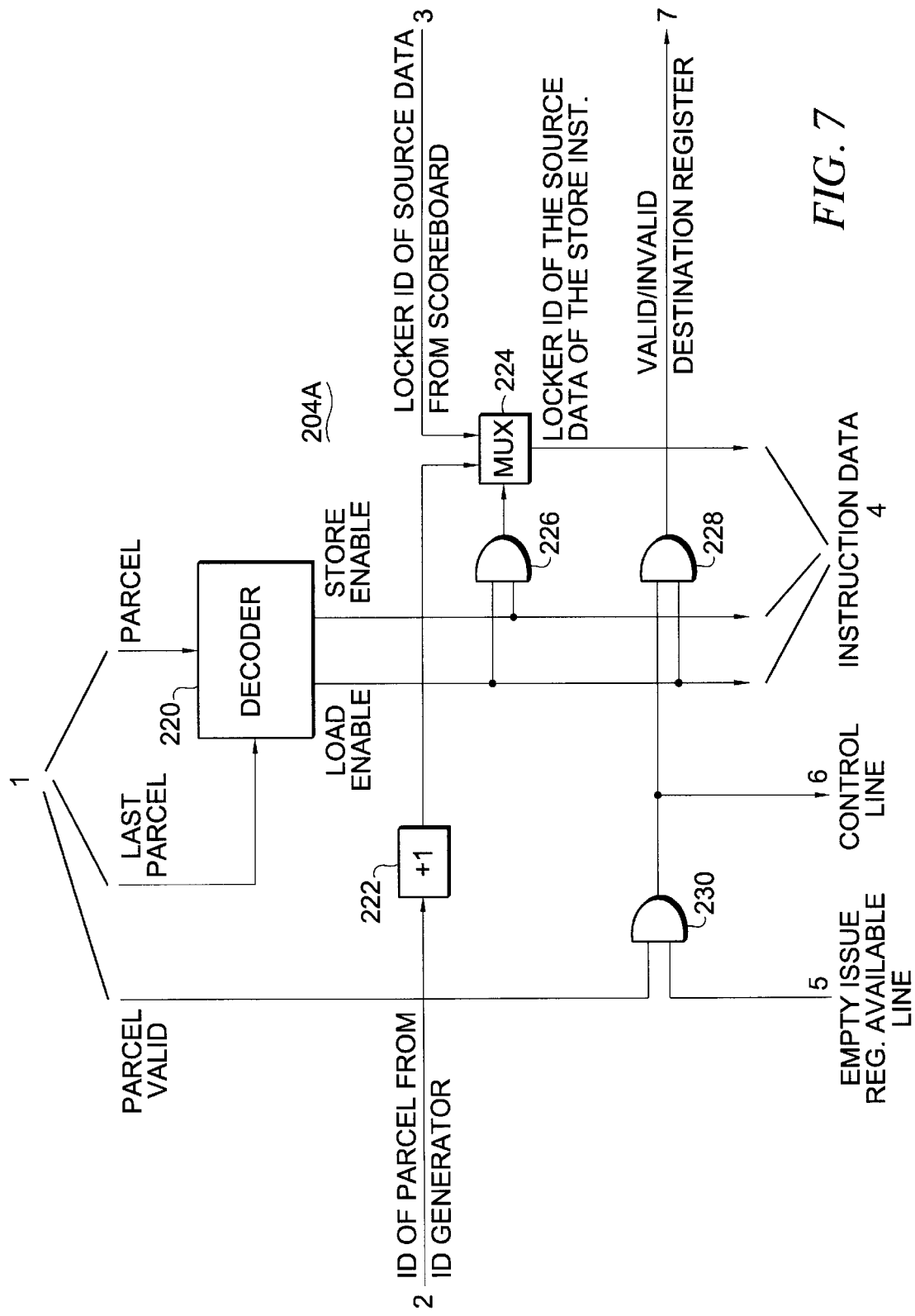
FIG. 7 shows a detailed diagram of a control logic in the decode stage in FIG. 6.

The scoreboard unit (sometimes called "Register Allocation Table" or "RAT" by Intel) ensures that there are no sequencing errors, even when the instructions are executed out of order, as explained above. The ID generator generates an ID for each parcel generated (see step 158 in FIG. 5A). The ID is incremented by one for each parcel. The control logic units control the operation of the decode stage. A more detailed diagram of the control unit is shown in FIG. 7. Since the control logic units 204A to 204D are identical, the control logic will be explained with reference to one of the control logic units, 204A.

With reference to FIG. 7, the control logic unit receives many different signals from the decode register FIFO 202, scoreboard unit 206, and issue register FIFO 210. The control logic unit also forwards signals to the decode register FIFO 202, scoreboard unit 206, ID generator 208, and the issue register FIFO 210.

In FIGS. 6 and 7, line 1 represents the content of the decode register FIFO, which contains a parcel valid signal, last parcel signal, and the parcel itself. The parcel valid signal informs whether the instruction from the instruction cache 132 (FIG. 4) is valid or not. If the instruction is not in the instruction cache, then the parcel is invalid and the main memory is sought to retrieve the valid instruction, which takes many additional clock cycles. Line 2 represents the ID of a parcel from the ID generator 208 (see step 156 in FIG. 5A) and line 3 represents the locker ID of source data from the scoreboard unit 206. Line 5 represents an empty issue register available signal line from the issue registers in issue register FIFO 210 (see step 156 from FIG. 3). Based on these input lines, the control logic unit outputs lines 4, 6, and 7, which correspond to the instruction data, control line, and the valid/invalid destination ID, respectively.

Within the control logic unit 204A, the parcel itself and the last parcel signal are received in a decoder 220 and the scoreboard valid signal is received in a logic AND gate 230. The logic AND gate 230 also receives empty issue register available line 5 to produce control line 6 that is sent to both the ID generator 208 and issue register FIFO 210. The control logic unit 204A informs the ID generator 208 and the issue register FIFO 210 whether the parcel is valid or invalid and whether there is an empty issue register available through the logic AND gate 230. Thus, the control line 6 controls whether the instruction should be moved from the decode register to the issue register depending on whether the parcel is valid and empty issue register is available.

The output of the AND gate 230 also becomes an input to another logic AND gate 228. Logic AND gate 228 also receives a load enable signal line output from decoder 220 and outputs a signal determining whether the destination register is valid/invalid. For the destination register to be valid, the parcel valid signal, empty issue register available signal, and the load enable signal must all be set to produce a logic high, for example, from AND gate 228. The decoder 220 outputs a store enable signal which is input to yet another logic AND gate 226. The load enable signal from the decoder 222 is also input to logic AND gate 226. The load enable and store enable signals from the decoder 220 is sent to the issue register FIFO 210 (the load and store enable signals are discussed in more detail in conjunction with the issue stage flowchart in FIG. 8).

The output of the logic AND gate 226 is connected to a multiplexer 224 as a selection line. The ID of the parcel from the ID generator in line 2 is input to an adder 222 which generates (ID+1), one of the inputs to the multiplexer 224. The locker ID of the source data from the scoreboard in line 3 is also input to the multiplexer (MUX) 224. The MUX 224 outputs the locker ID of the source data of the store instruction. In particular, depending on the logical AND result of the load enable and store enable signals, either the incremented ID of the parcel from the ID generator or the locker ID of the source data from the scoreboard is output from the MUX 224. For example, for the case where the instruction contains both load and store of a same memory address setting the load and store enable bits, the incremented ID of the parcel from the ID generator will come out of the MUX 224 as the locker ID of the source data of the store instruction. For other permutations of the load and store enable signals where at least one of the load and store enable signals are not set, the locker ID of source data from the scoreboard is output from the MUX 224. Thus, the store operation need not calculate the memory address since the memory address was already calculated during the load operation (first parcel) and obtainable from the locker ID.

The locker ID of the source data of the store instruction output from the MUX 224, the store enable, and the load enable together form instruction data 4. Control line 6 of the control logic unit 204A determines whether to move the data 4 from the decode register to the issue register. Accordingly, if the parcel is valid and empty issue register is available, then the control line 6 allows the instruction data 4 to move to the issue register.

The valid/invalid destination register line 7 becomes valid when (1) the parcel is valid, (2) an empty issue register is available, and (3) load enable signal is true. If any of these three conditions are not met, then line 7 is input to the scoreboard unit 206 as invalid.

When the decode register moves the instruction to the issue registers, the decode stage gives way to the issue stage. The flowchart of the issue stage is shown in FIG. 8 and a block diagram of an implementation of the flowchart in FIG. 8 is shown in FIG. 9.

Figure 8:
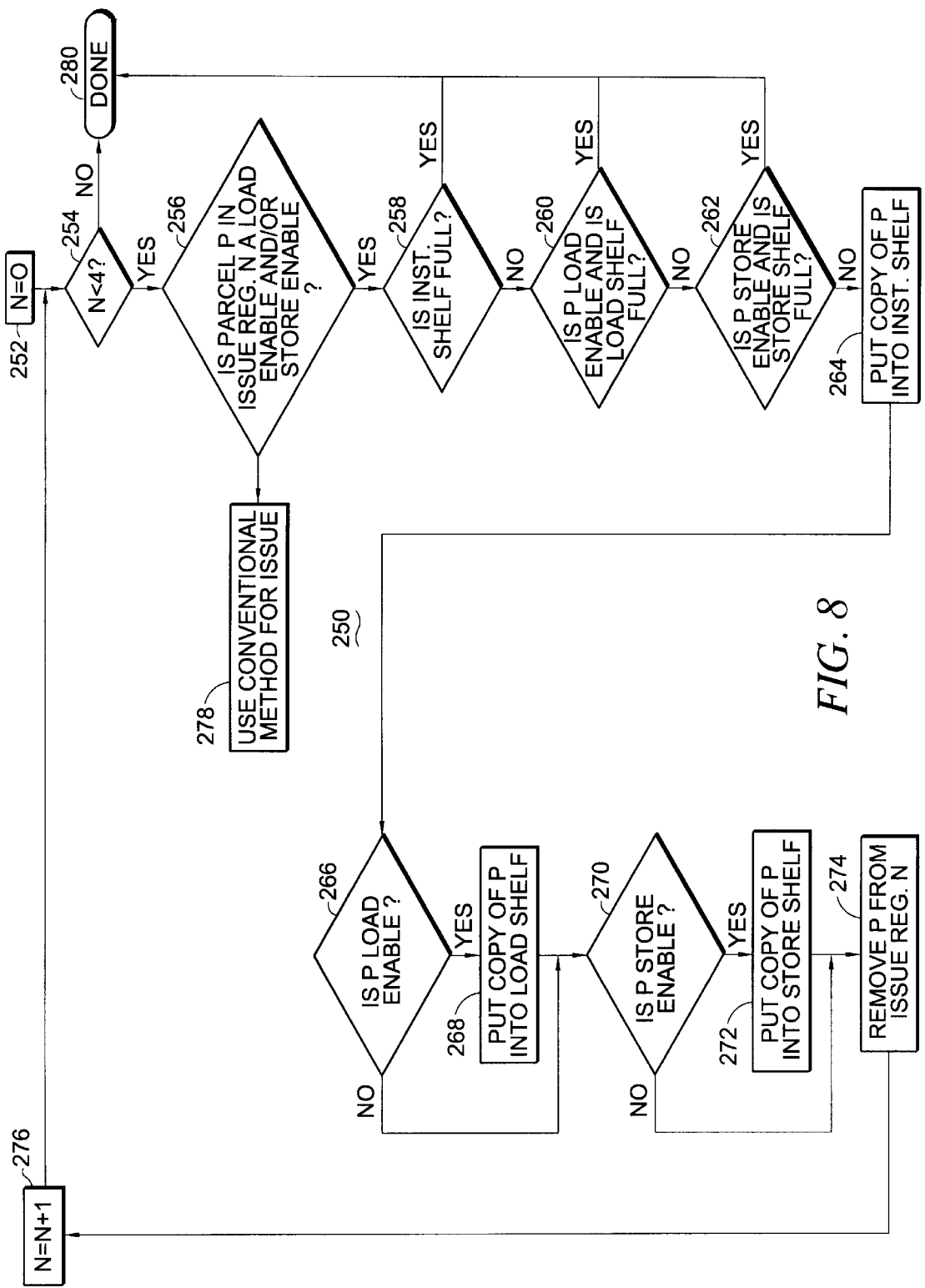
FIG. 8 is a flowchart of an issue stage in accordance with the present invention.
Figure 9:
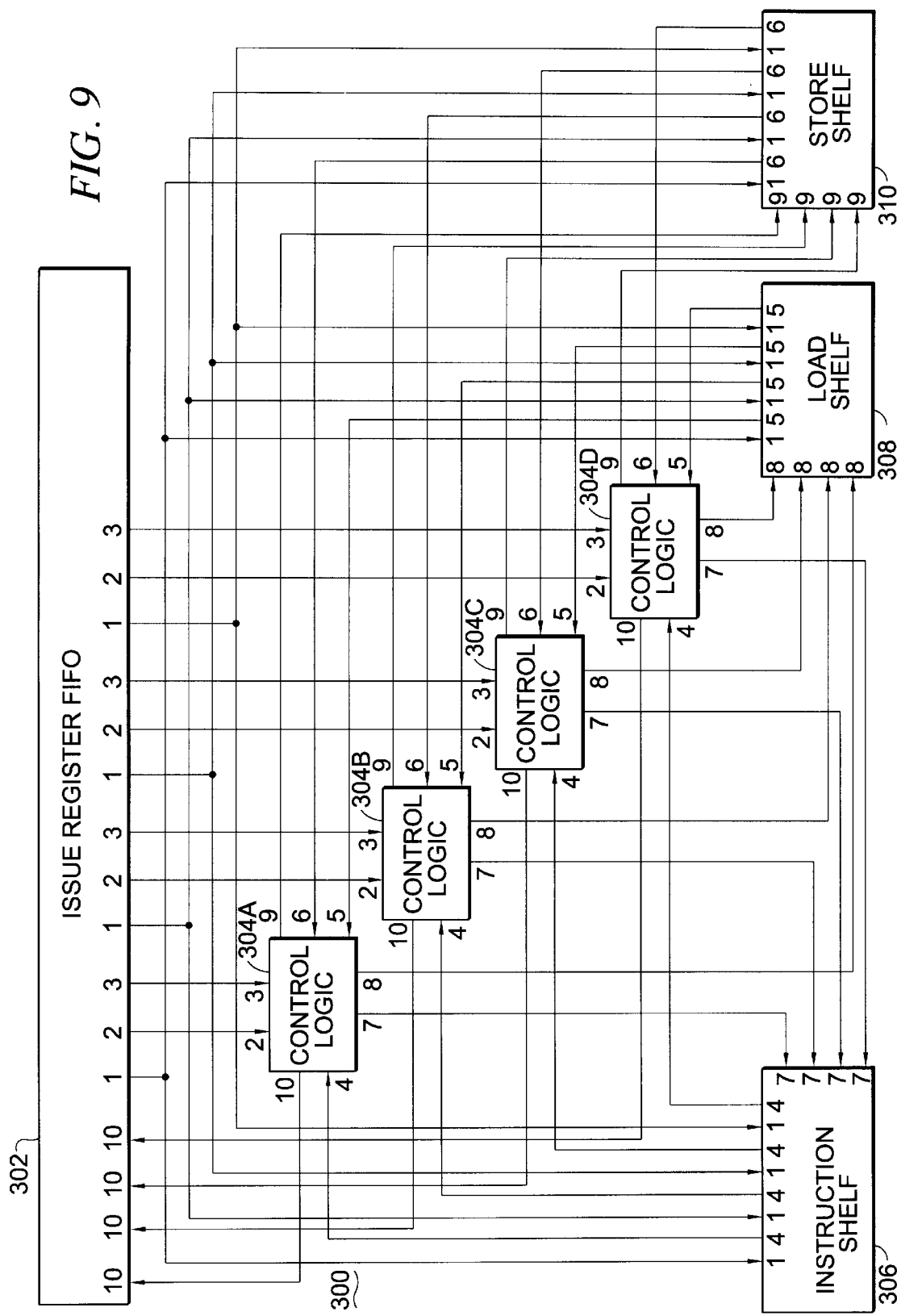
FIG. 9 is a block diagram of a preferred embodiment of the issue stage shown in FIG. 8.

FIGS. 8 and 9 show the flowchart and block diagram of the issue stage, respectively, in accordance with the present invention. Referring to FIG. 8, since there are up to four decode registers in the present embodiment, the issue stage first determines whether a counter N is less than 4 (step 254), similar to the decode stage shown in FIG. 5A. The counter is initialized in step 252. If the counter N is not less than 4, then the issue stage is done (step 280). If the counter N is less than 4, then it is determined whether parcel P in the issue register is a load enable and/or store enable (step 256). If the parcel P is neither a load enable nor a store enable, then the conventional method is used for issuing the instruction. The conventional method for issuing the instruction (step 278) is described, for example, in the '156 patent, the Metaflow Architecture, and the Sohi paper discussed above.

If the parcel P in issue is a load enable and/or a store enable, then it is determined whether the instruction shelf is full (step 258). If the instruction shelf is full, then the process is done. If the instruction shelf is not full (step 258), then it is determined whether the parcel P is a load enable and if the load shelf is full (step 160). If so, then the process is done (step 280). If not, then it is determined whether parcel P is a store enable and if the store shelf is full (step 262). If so, then the process is done (step 280). If not, then a copy of the parcel is put into the instruction shelf (step 264).

Subsequently, if the parcel is a load enable (step 266), then a copy of the parcel is put into the load shelf (step 268).

Then, it is determined whether the parcel is a store enable (step 270). If so, then a copy of the parcel is put into the store shelf (step 272). Then, the parcel is removed from the issue register (step 274). Then, the counter N is incremented (step 276) and the process starts over again.

A preferred embodiment of an implementation of the flowchart 250 in FIG. 8 is shown in FIG. 9. The issue stage 300 shown in FIG. 9 includes the issue register FIFO 302 (which is labeled 210 in FIG. 6), control logic units 304A, 304B, 304C, and 304D, instruction shelf 306, load shelf 308, and store shelf 310. The signal lines shown in FIG. 9 from 1–10 represent the following:

| Signal Line | Signal Name |
| --- | --- |
| 1 | parcel |
| 2 | load enable |
| 3 | store enable |
| 4 | instruction shelf full line |
| 5 | load shelf full line |
| 6 | store shelf full line |
| 7 | control siqnal to copy parcel to instruction shelf |
| 8 | control signal to copy parcel to load shelf |
| 9 | control signal to copy parcel to store shelf |
| 10 | control signal to remove parcel from issue register |

As shown in FIG. 9, the load enable and store enable signals are sent from the issue register FIFO 302 to each of the control logic units 304A–304D. The parcel is sent from the issue register FIFO 302 to each of the instruction shelf, load shelf, and store shelf according to the control signals 7, 8, and 9, respectively. Signal lines 4, 5, and 6 are sent from the instruction shelf 306, load shelf 308, and store shelf 310, respectively, to inform the control logic units whether the shelves are full. Signal line 10 informs the issue register FIFO 302 to remove the parcel from the issue registers by the control logic units.

Figure 10:
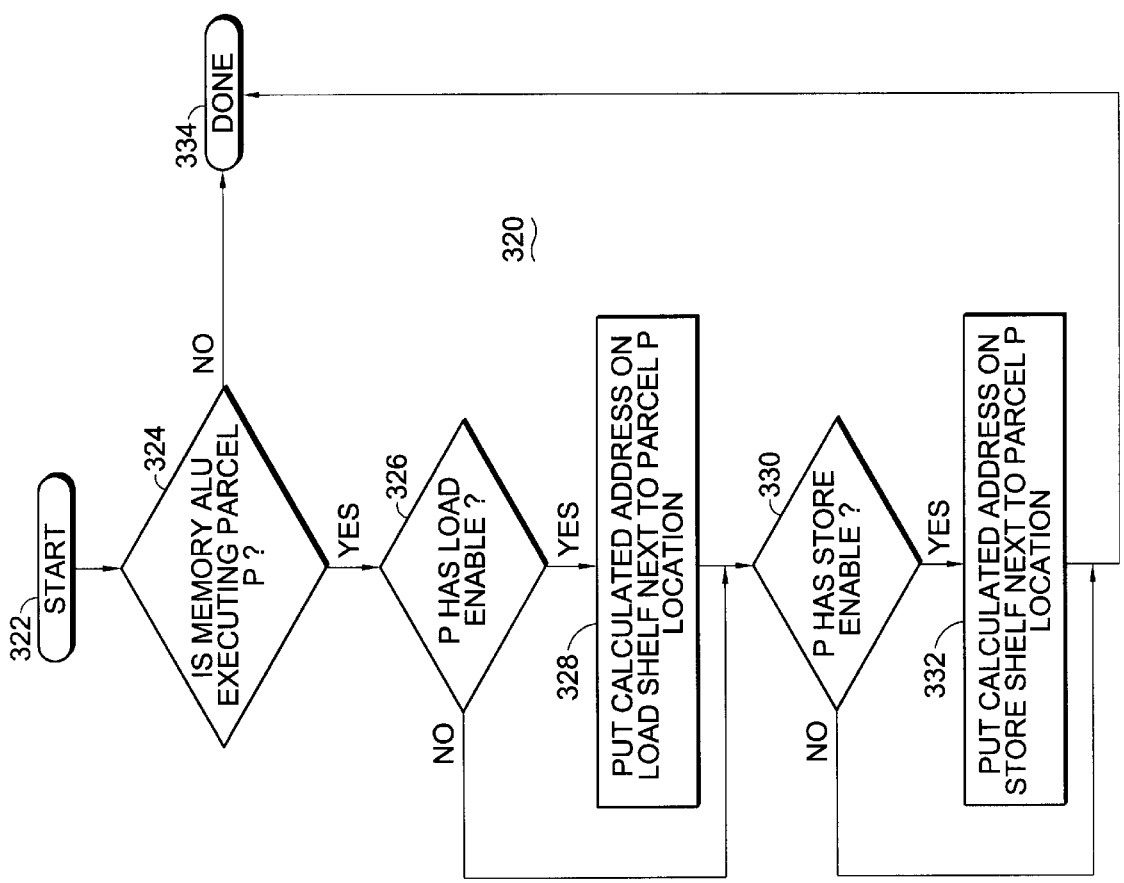
FIG. 10 is a flowchart of an execute stage in accordance with the present invention.
Figure 11:
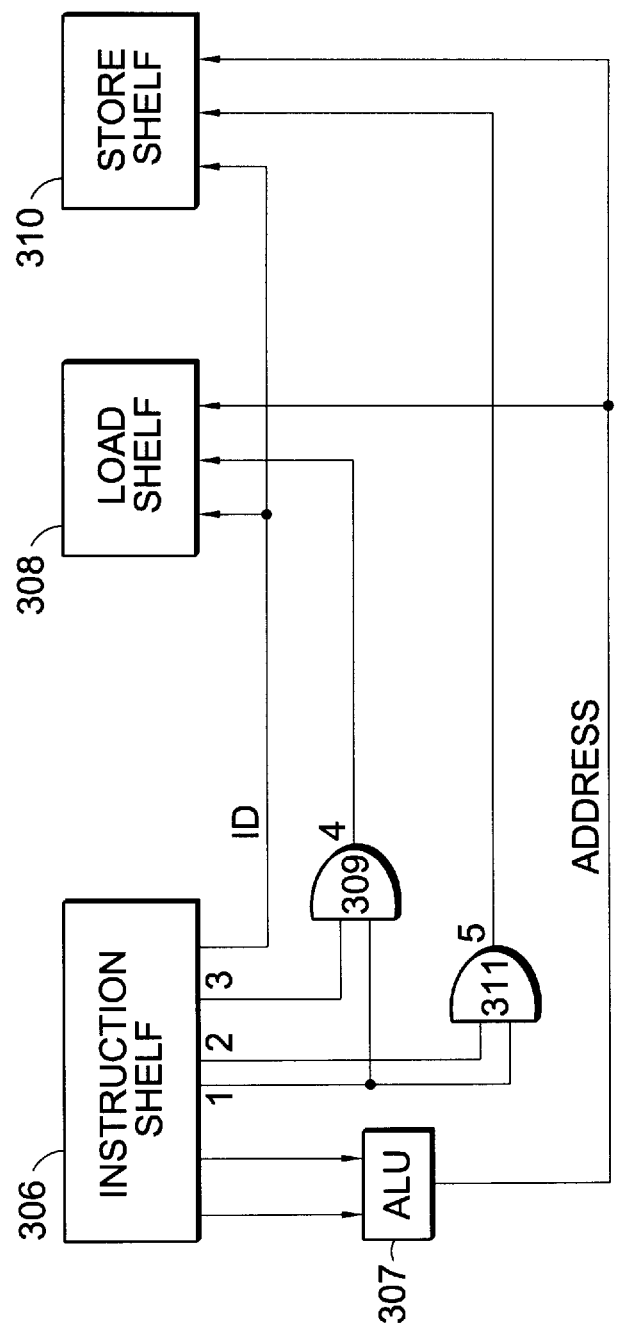
FIG. 11 is a block diagram of a preferred embodiment of the execute stage shown in FIG. 10.

Accordingly, the parcels are issued from the issue stage and the pipeline advances to the execute stage. FIGS. 10 and 11 show the flowchart and block diagram of the execute stage, respectively, in accordance with the present invention. Referring to FIG. 10, the flowchart 320 of the execute stage determines whether the memory arithmetic logic unit (ALU) is executing a parcel (step 324). If not, then the process is done. If yes, it is determined whether the parcel has load enable (step 326). If yes, then the calculated address of the memory is put on the load shelf next to the parcel location (step 328). If the parcel does not have load enable, then step 328 is skipped. Then, it is determined whether the parcel has store enable (step 330). If so, then the calculated address of the memory is placed on the store shelf next to the parcel location (step 332). If the parcel does not have store enable, then step 332 is skipped, and the process is done.

A preferred embodiment of an implementation of the execute flowchart 320 shown in FIG. 10 is shown in FIG. 11. Referring to FIG. 11, the execute stage includes instruction shelf 306, load shelf 308, store shelf 310, ALU 307, and logic gates 309 and 311. The instruction shelf 306 is connected to the load shelf 308 and store shelf 310 directly to provide the ID of the parcel. The instruction shelf 306 is also connected to the load shelf and store shelf through an ALU 307 to provide the address of the memory location. Further, the instruction shelf 306 is connected to the load shelf 308 and store shelf 310 through AND gates 309 and 311, for example, to write the address into the load shelf and the store shelf next to the ID of the parcel. In particular, signal line 4 represents the control signal to write the address into the load shelf next to the ID of the parcel, and signal line 5 represents the control signal for writing the address into the store shelf next to the ID of the parcel. Signal lines 1, 2, and 3 from the instruction shelf represent a valid signal line for executing the instruction, store enable, and load enable, respectively.

Once the execution is complete, the retire phase (see FIG. 2) examines the oldest instructions shelved. At each clock cycle, all appropriate instructions are retired (see the Metaflow architecture, for example). Thus, in the present invention, only two parcels (e.g., LDST and ADD) are retired for an instruction containing both load and store operations instead of three parcels required in the conventional system.

Figure 12B:
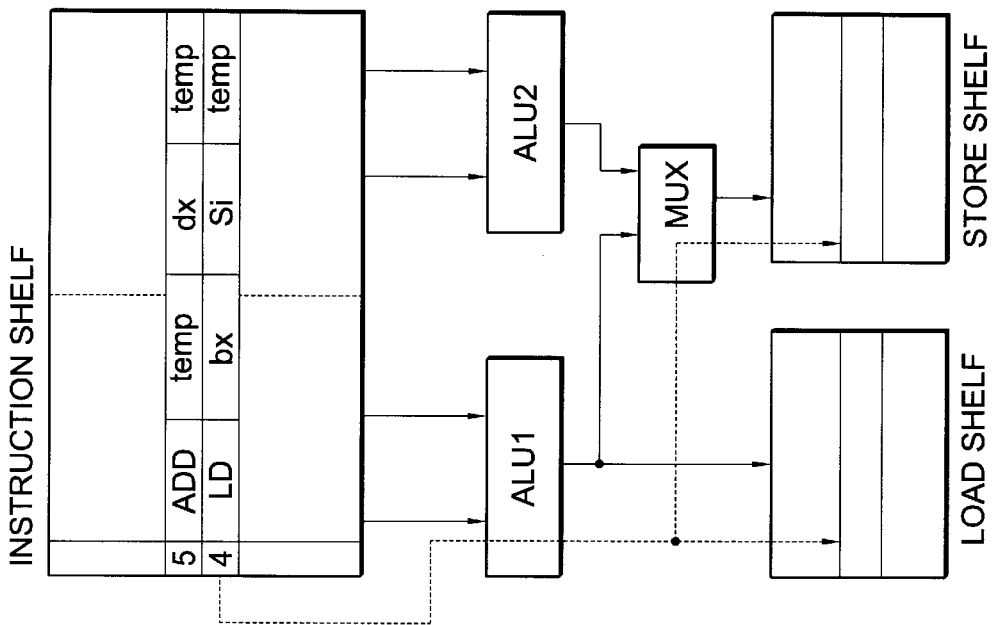
FIGS. 12A and 12B illustrate the conventional method and the present invention, respectively, using an example instruction.
Figure 12A:
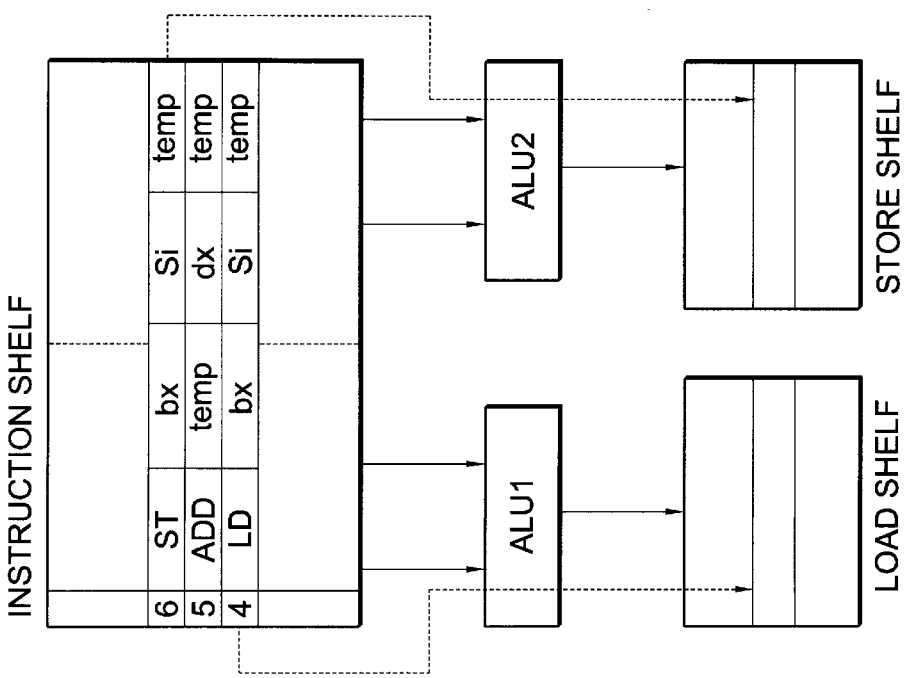

FIGS. 12A and 12B illustrate a comparison between the conventional system and the present invention, respectively, using an example instructions discussed above. The example instructions in FIGS. 12A has three components—LOAD, ADD, and STORE. Borrowing the x86 convention, the three conventional parcels are as follows:

LD [bx+si], temp

ADD temp, dx

ST [bx+si], temp where "bx+si" is the address of the memory, "temp" is a temporary register, and "dx" is a register. This three component instruction loads the contents of memory address "bx+si" to a temporary register "temp." The contents of the temporary register is added to the contents of register dx and the result is placed back in the temporary register. Then, the contents of the temporary register is written back in the same memory address "bx+si." Thus, the conventional system parses this instruction using three parcels in the parse stage. The first parcel calculates the memory address of the operand and and loads the operand from the memory to a temporary register. The second parcel performs a register-to-register operation. The third parcel recalculates the same memory address to store the result of the second parcel and places the contents of the register in the memory.

This conventional system is shown in FIG. 12A where the three components (parcels) of the instruction are placed in the instruction shelf with ID's 4, 5, and 6 for LD, ADD, and ST, respectively. Two ALUs are needed in FIG. 12A to calculate the address for the load (ALU1) and the address for the store (ALU2) separately, even for the same memory location. The dotted lines represent the path taken by the process In the conventional system, the memory address is calculated two times requiring more time and the usage of two ALUS. The results from the ALUs are placed in the load shelf and the store shelf.

The present invention recognizes that the memory address need not be calculated the second time. Thus, as shown in FIG. 12B, the present invention reduces the above three component instruction to a two component instruction requiring only two parcels. The first parcel contains a load-store LDST operation and the second parcel contains the register-to-register operation, as in the following:

LDST [bx+si], temp

ADD temp, dx

The LDST operation calculates the address of the memory once and loads the content of the memory address to temp in the first parcel. The first parcel then waits on the store portion of the operation until the ADD operation of the second parcel is complete at which time the store operation is performed using the address calculated previously to complete the first parcel.

FIG. 12B also shows a block diagram of the instruction shelf, load shelf and store shelf in accordance with the present invention. In particular, the load portion of the LDST operation follows a path from the instruction shelf to the ALU1 to the load shelf while the store portion of the LDST operation follows a path from the instruction shelf to ALU1 to a multiplexer MUX and finally to the store shelf. Here, ALU2 is not used since only one address calculation is performed in the present invention. Thus, since only one ALU calculation is needed for the entire instruction, ALU2 is free for other uses such as calculating an address for a different instruction. Moreover, since the third parcel is not needed, clock cycles and parse bandwidth are improved.

As shown in FIGS. 12A and 12B, the instruction shelf has scoreboard ID numbers at the left-hand column. In FIG. 12A, the scoreboard IDs for LD, ADD, and ST are "4," "5," and "6," respectively. The locker ID for ADD is the scoreboard ID for LD (4) and for ST is the scoreboard ID for ADD (5). In FIG. 12B, which shows the present invention, the scoreboard ID for LDST and ADD are "4" and "5" and the locker ID for ST is the scoreboard ID of LDST (4). Referring to FIG. 5D, the scoreboard [ID] for the above example is temp, which is the destination and source register and the locker ID of the source data is (ID+1), which is (4+1)=5, since the parcel ID is equal to 4. Thus, in the present invention, the address of the memory for storing is easily obtained from a known location in the scoreboard.

The system and method for processing instructions in accordance with the present invention has many advantages in each stage of the processor pipeline over the conventional system. For example, in the parse stage, only two parcels are generated for an instruction requiring both load and store and an arithmetic operation as oppose to three in the conventional system. In the decode stage, both load enable and store enable are generated for the same parcel where the locker ID of source data to be stored is the ID of the load-store parcel plus one (ID+1). In the issue stage, one parcel can be placed on both the load shelf and the store shelf. In the execution stage, only one ALU calculation cycle is needed for the entire instruction instead of the two needed in the conventional system. In the retire stage, only two parcels need to be retired instead of three, taking less of the limited retire bandwidth. Accordingly, the present invention provides many advantages over the conventional processor system.

It will be apparent to those skilled in the art that various modifications and variations can be made in the floating point operation system of the present invention without departing from the spirit or scope of the invention. Thus, it is intended that the present invention cover the modifications and variations of this invention provided they come within the scope of the appended claims and their equivalents.

What is claimed is:

1. A data processing system comprising:

an instruction unit generating a program instruction;

a parse unit coupled to the instruction unit and receiving the program instruction, the parse unit determining whether the instruction requires both load and store operations and generating only first and second parcels for the instruction containing both load and store operations;

a decode unit coupled to the parse unit and receiving the first and second parcels, the decode unit attaching a different identification number to the first and second parcels, the identification number of the second parcel being determinable from the identification number of the first parcel; and an issue unit coupled to the decode unit and receiving the first and second parcels and issuing the first and second parcels.

2. The data processing system according to claim 1, wherein the parse unit includes:

an instruction parser connected to the instruction unit and receiving the program instruction;

a decoder connected to the instruction parser; and a parse control unit connected to the instruction parser and the decoder, the parse control unit controlling operation of the parse unit.

3. The data processing system according to claim 1, wherein the decode unit includes:

decode registers receiving the first and second parcels from the parse unit;

identification number generator connected to the decode registers and generating the identification number for the first and second parcels;

scoreboard unit connected to the decode registers and the identification number generator, the scoreboard unit including a locker identification number of a data to be stored in a memory; and control logic unit connected to the decode registers, the identification number generator and the scoreboard unit, the control logic unit controlling operation of the decode unit.

4. The data processing system according to claim 3, wherein the control logic unit includes:

a decoder receiving one of the first and second parcels and outputting a load enable signal and a store enable signal when the one of the first and second parcels contains load and store operations;

a first logic unit coupled to the load and store enable signals;

a second logic unit coupled to the load enable signal and a signal informing valid parcel and empty issue register available, the second logic unit outputting whether a destination register is valid;

an adder coupled to the identification number from the identification number generator and outputting the identification number plus a constant number; and a multiplexer receiving an output of the adder and a locker identification number, and outputting a signal according to an output from the first logic unit.

5. The data processing system according to claim 1, wherein the issue unit issues the first and second parcels to an instruction shelf, a load shelf, and a store shelf for instruction execution.

6. The data processing system according to claim 5, wherein the issue unit includes:

issue registers receiving the first and second parcels from the decode unit; and control logic units connected to the issue registers, the instruction shelf, the load shelf, and the store shelf, the control logic units controlling a copying of the first and second parcels to appropriate ones of the instruction shelf, the load shelf, and the store shelf.

7. The data processing system according to claim 1, wherein the load and store operations concern a same address location in a memory and the address is calculated only once for the program instruction.

8. The data processing system according to claim 1, further comprising an execution unit including one address calculating unit requiring only one address calculating cycle for the program instruction.

9. The data processing system according to claim 1, wherein the execution unit includes:

the instruction shelf outputting a valid signal line for executing the instruction, a load enable signal, and a store enable signal;

the load shelf connected to the instruction shelf;

the store shelf connected to the instruction shelf;

an arithmetic logic unit connected to the instruction shelf; and a logic unit receiving the valid signal line, the load enable signal, and the store enable signal from the instruction shelf, the logic unit outputting first and second control signals to the load shelf and store shelf, respectively.

10. A method for processing data comprising the steps of:

parsing an instruction containing both load and store operations to generate only first and second parcels;

decoding the first and second parcels;

issuing the first and second parcels; and executing the first and second parcels.

11. The method for processing data according to claim 10, wherein the load and store operations are performed in only one of the first and second parcels.

12. The method for processing data according to claim 10, wherein the load and store operations have the same address location in memory and the address location is calculated only once for both the load and store operations.

13. The method for processing data according to claim 10, wherein the step of decoding the first and second parcels includes the step of generating both a load enable signal and a store enable signal for a same parcel.

14. The method for processing data according to claim 12, wherein the step of decoding the first and second parcels includes the step of generating a locker identification number of a source data to be stored in a memory as an identification number of the first parcel having the load and store operations plus a constant number.

15. The method for processing data according to claim 10, wherein the step of issuing the first and second parcels places one of the first and second parcels on both a load shelf and a store shelf.

16. The method for processing data according to claim 10, wherein the step of executing the first and second parcels consumes only one address calculation cycle for the instruction.

17. The method for processing data according to claim 10, further comprising the step of retiring the first and second parcels.

18. A method for processing data comprising the steps of:

parsing an instruction containing both load and store operations to generate only first and second parcels;

decoding the first and second parcels, the step of decoding the first and second parcels including the step of generating both a load enable signal and a store enable signal for a same parcel;

issuing the first and second parcels and placing one of the first and second parcels on both a load shelf and a store shelf; and executing the first and second parcels.

19. The method for processing data according to claim 18, wherein the load and store operations have the same address location in memory and the address location is calculated only once for both the load and store operations.

20. The method for processing data according to claim 18, wherein the step of decoding the first and second parcels includes the step of generating a locker identification number of a source data to be stored in a memory as an identification number of the first parcel having the load and store operations plus a constant number.

21. The method for processing data according to claim 18, wherein the step of executing the first and second parcels consumes only one address calculation cycle for the instruction.

22. The method for processing data according to claim 18, further comprising the step of retiring the first and second parcels.

23. The method for processing data according to claim 18, wherein the instruction containing both the load and store operations also contains an additional operation, the first parcel containing the load and store operations and the second parcel containing the additional operation.

* * * * *